(12) United States Patent
Williams

(10) Patent No.: US 11,835,330 B2
(45) Date of Patent: Dec. 5, 2023

(54) PARTIAL COHERENCE MITIGATION IN VIDEO MEASUREMENT SYSTEMS VIA ILLUMINATION APODIZATION

(71) Applicant: QUALITY VISION INTERNATIONAL INC., Rochester, NY (US)

(72) Inventor: Daniel James Lawler Williams, Rochester, NY (US)

(73) Assignee: Quality Vision International Inc., Rochester, NY (US)

( * ) Notice: Subject to any disclaimer, the term of this patent is extended or adjusted under 35 U.S.C. 154(b) by 286 days.

(21) Appl. No.: 17/166,239

(22) Filed: Feb. 3, 2021

(65) Prior Publication Data

US 2022/0244038 A1    Aug. 4, 2022
US 2023/0037274 A2    Feb. 2, 2023
US 2023/0213330 A2    Jul. 6, 2023

(51) Int. Cl.
*G01B 11/02* (2006.01)
*G02B 5/02* (2006.01)
*G02B 26/08* (2006.01)

(52) U.S. Cl.
CPC .......... *G01B 11/022* (2013.01); *G02B 5/0236* (2013.01); *G02B 26/0816* (2013.01)

(58) Field of Classification Search
CPC ... G02B 5/0278; G01B 11/022; G01N 21/455
See application file for complete search history.

(56) References Cited

U.S. PATENT DOCUMENTS 5,610,391 A     3/1997  Ringlien
6,243,162 B1 *  6/2001  Baist .................. G01N 21/88
                                              356/237.1
(Continued)

FOREIGN PATENT DOCUMENTS

CN     1131740 A    9/1996
EP     698776 A2    2/1996
(Continued)

OTHER PUBLICATIONS

Considine (1966) "Effects of Coherence on Imaging Systems," Journal of the Optical Society of America 56: 1001-1009.
(Continued)

*Primary Examiner* — Michael P LaPage
(74) *Attorney, Agent, or Firm* — Jodi A. Reynolds, Esq.; Harter Secrest & Emery LLP

(57) ABSTRACT

A video measurement system for measuring a test object comprising an imaging system comprising an imager having an imaging pupil, the imager arranged for viewing at least a portion of a silhouette of the test object by receiving light transmitted by the test object over a first angular extent; and an illumination system comprising (i) an illumination source; (ii) output having a second angular extent in object space that is larger than the first angular extent received by the imaging pupil; and (iii) a substrate arranged to diffuse light from the illumination source, the substrate having an axial centerline and a light obscuration element, wherein the light obscuration element is at least approximately coaxial to the axial centerline of the substrate, and wherein the pupils of the illumination and imaging systems are in at least approximately conjugate image planes.

27 Claims, 13 Drawing Sheets

(56) References Cited

U.S. PATENT DOCUMENTS

| | | | |
|---|---|---|---|
| 6,625,102 | B1 | 9/2003 | Hashimoto |
| 6,847,442 | B1 | 1/2005 | Katzir et al. |
| 7,889,338 | B2 | 2/2011 | Heiden |
| 9,784,564 | B2 | 10/2017 | Schwab et al. |
| 10,701,259 | B2 | 6/2020 | Bloch |
| 2003/0011881 | A1* | 1/2003 | Sure .................. G02B 21/0032 359/368 |
| 2004/0156109 | A1* | 8/2004 | Hoover ............... G02B 5/0278 359/368 |
| 2013/0038941 | A1 | 2/2013 | Pesach et al. |
| 2015/0341605 | A1* | 11/2015 | Yamada ............ G02B 27/0927 353/30 |
| 2018/0329190 | A1* | 11/2018 | Bloch .................. G02B 21/06 |
| 2020/0150318 | A1* | 5/2020 | Vermeer ............. G02B 5/0263 |

FOREIGN PATENT DOCUMENTS

| | | |
|---|---|---|
| EP | 1172682 A1 | 1/2002 |
| JP | H08184416 A | 7/1996 |
| JP | 2000-356758 A | 12/2000 |
| JP | 2015-087536 A | 5/2015 |
| KR | 10-2001-0102523 A | 11/2001 |
| WO | 2000/055677 A1 | 9/2000 |

OTHER PUBLICATIONS

Edmund Optics "Telecentric Illumination," Imaging Resource Guide, Section 11.4, 3 pages, accessed Feb. 1, 2023.
Goodman (1979) "Stationary Optical Projectors," Dissertation, Univ. Arizona, 475 pages.
Goodman (2004) "Graphical methods to help understand partially coherent imaging," Proc. SPIE 5377, Optical Microlithography XVII.
Hopkins (1953) "On the Diffraction Theory of Optical Images," Proceedings of the Royal Society 217(1130): 408-432.
Japan Patent Office (ISA/JP), International Search Report and Written Opinion in PCT/US2022/014072, dated May 17, 2022, 6 pages.
Jerke (1975) "Optical and Dimensional-Measurement Problems With Photomasking in Microelectronics," National Bureau of Standards special publication 400-20, 50 pages.
Senchenko et al. (2011) "Shadow Inspection of 3D Objects in Partially Coherent Light," Measurement Science Review 11(4): 104-107.
Vandendriessche "Polarizer Selection Guide," Edmund Optics Worldwide, 7 pages, accessed Feb. 1, 2023.
https://web.archive.org/web/20140913131412/http://www.avtanski.net/diy/?p=15 "One-Penny Darkfield Illumination Filter," accessed Mar. 21, 2023, 2 pages.

* cited by examiner

PARTIAL COHERENCE MITIGATION IN VIDEO MEASUREMENT SYSTEMS VIA ILLUMINATION APODIZATION

BACKGROUND OF THE INVENTION

Field of the Invention

This invention relates to illuminators for video measurement systems, and more particularly to such illuminators that provide for apodizing the illuminator.

Description of Related Art

Video measurement machines gather metrological data from test objects. U.S. Pat. Nos. 10,701,259 and 9,784,564 teach various aspects of such video measurement machines and are incorporated herein by reference in their entirety. One way video measurement machines gather metrological data is by "backlighting," wherein the test object is illuminated from one direction and the test object is imaged from the opposite direction. When backlighting a test object, the test object itself appears dark to the imaging system and the remaining background appears light. Thus, the test object appears in silhouette. The object profiles are then identified by the points of transition between light and dark, where the light that surrounds or passes through the test object is contrasted with adjacent portions of the view at which light is blocked. The imaging system then images the test object silhouettes. Object profiles can then be identified by the points of transition where light that surrounds or passes through the test object is contrasted with adjacent portions of the view at which light is blocked. Backlights of video measuring machines are typically designed to form an angularly uniform illumination distribution, but this can cause an apparent shift of edges on the backlit test objects as observed on video measurement machines. The apparent edge shift goes from dark-to-light regardless of the orientation of the edges, so that silhouettes of opaque, backlit objects generally measure larger than expected and the inner diameter of rings measure smaller than expected. This is due largely to an optical phenomenon called partial coherence.

There are several techniques used to resolve the problem of shifted edges. Typically, the aperture stop of the illuminator is approximately matched to the aperture stop of the imaging system to limit the range of angles through which the object is illuminated. Overfilled imaging system apertures have higher angles of light that can enter the imaging system aperture by specular or diffuse reflections which may cause the boundaries of the object silhouette to be obscured. Thus, a certain range of angles is collected by the imaging system to image the silhouette boundaries while the range of illumination angles is limited to avoid unnecessarily illuminating the test object from different directions. Current configurations of video measuring machines can provide a magnitude of the apparent edge shift of a backlit test object of less than 10 μm. However, this edge shift is observable and still consequential in many applications. Incoherent illumination, or vastly increasing the angular extent of illumination has also been considered as an illumination solution to edge shift. For an F/100 imager, experiences have shown that increasing the illumination from F/50 to F/5 greatly reduces the magnitude of the apparent edge shift. Moreover, placing a diffuser immediately after a backlight or opening the backlight pupil can help some objects measure closer to nominal, for example, "zero thickness" chrome on glass reticles. These techniques, however, can still create problems when measuring certain test parts. For example, a "wraparound" effect can be observed when test objects with curved or inclined surfaces, such as a gage pin, are measured. The "wraparound" effect is a result of the wide angular extent of the illumination reflecting from the curved or inclined surfaces within the test object profile and entering the imagining system aperture. In other words, edges created by curved or inclined walls can specularly reflect light into the imager, introducing another error source into edge localization. Another possible technique to resolve the problem of shifted edges is to correct the values using software after the edges of interest have been located. In this case, the true edge position is determined by both system- and object-specific post-processing of edge profiles. Typically, a nuanced algorithm is used to find the true edge position, requiring inputs of illumination angular extent and object-edge depth. A problem with this approach, however, is that it is more desirable to acquire an image where no such corrections are needed and a prior knowledge of the object is unnecessary.

BRIEF SUMMARY OF THE INVENTION

The invention contemplates a video measurement system for measuring a test object where partial coherence-induced edge shift is mitigated via illumination apodization. According to one approach, a video measurement system for measuring a test object comprises an imaging system comprising an imager having an imaging pupil, the imager arranged for viewing at least a portion of a silhouette of the test object by receiving light transmitted by the test object over a first angular extent, and, an illumination system comprising (i) an illumination source; (ii) output having a second angular extent in object space that is larger than the first angular extent received by the imaging pupil; and (iii) a substrate arranged to diffuse light from the illumination source, the substrate having an axial centerline and a light obscuration element, wherein the light obscuration element is at least approximately coaxial to the axial centerline of the substrate, and wherein the pupils of the illumination and imaging systems are in at least approximately conjugate image planes.

In one configuration, the substrate of the video measurement system comprises a front surface illuminated by the illumination source and a back surface wherein the light obscuration element is disposed on the front surface and is at least approximately coaxial to the axial centerline of the substrate. The substrate is a volumetric diffuser in certain configurations. The illumination system of the video measurement system in certain configurations has an object space numerical aperture that is larger than an object space numerical aperture of the imager. Typically, the imaging pupil axial centerline is at least approximately aligned with the light obscuration element. The second angular extent of the first illumination system in some configurations is twice as large as the first angular extent received by the imaging pupil. Moreover, the illumination system in a configuration further comprises an illumination pupil having an axial centerline and wherein the substrate further comprises a bore in the front surface and a ball disposed within the bore, wherein the bore is approximately coaxial to the axial centerline of the illumination pupil. The ball is an opaque, spherical ball in some configurations and the bore is substantially cylindrical.

In another configuration, the substrate of the video measurement system comprises a front surface illuminated by the illumination source and a back surface, wherein the light obscuration element is a pair of linear polarized filters comprising (i) a first linear polarizing filter located between the illumination source and the front surface of the substrate; and (ii) a second linear polarizing filter overlapping the first linear polarizer, wherein one of the first and second linear polarizing filters is rotated in relation to the other one of the first and second linear polarizing filters. The illumination system in this configuration can further comprise an illumination pupil having an axial centerline, wherein a diameter of the second linear polarizing filter is smaller than a diameter of the illumination pupil and at least approximately coaxial to the axial centerline of the illumination pupil, and wherein the second linear polarizing filter is larger than a diameter of the conjugate image of the imaging pupil at the back surface of the substrate. In a configuration, the second linear polarizing filter is adhered to the back surface of the substrate. In another configuration, the second linear polarizing filter is adhered to the front surface of the substrate. In yet another configuration, the second linear polarizing filter is located between the illumination source and the first linear polarizing filter. The substrate can be rotated to rotate the second linear polarizing filter relative to the first linear polarizing filter. In one configuration, a mechanism rotates the first linear polarizing filter relative to the second linear polarizing filter.

According to another approach, a video measurement system for measuring a test object comprises an imaging system comprising an imaging pupil, the imager arranged for viewing at least a portion of a silhouette of the test object by receiving light transmitted by the test object over a first angular extent, an illumination system comprising an illumination source and having a second angular extent that is larger than the first angular extent received by the imaging pupil and a output wherein the pupils of the illumination and imaging systems are in at least approximately conjugate image planes, a substrate arranged to diffuse light from the illumination source, the substrate having a front surface and a back surface, wherein a bore is disposed in the front surface and wherein the front surface is illuminated by the illumination source; and an opaque ball disposed in the bore in the front surface of the substrate and sized to provide light obscuration of a portion of light from the illumination source. In some configurations, substrate front surface is diffuse and the substrate back surface is diffuse. In a configuration, the ball is a spherical ball bearing and the bore is substantially cylindrical. The imaging pupil and the ball each have an axial centerline, wherein the imaging pupil is at least approximately coaxial to the axial centerline of the ball.

In yet another approach, a video measurement system for measuring a test object comprises an imaging system comprising an imager having an imaging pupil, the imager arranged for viewing at least a portion of a silhouette of the test object by receiving light transmitted by the test object over a first angular extent, an illumination system having an illumination source and a second angular extent that is larger than the first angular extent received by the imaging pupil and a output, wherein the pupils of the illumination and imaging systems are in at least approximately conjugate image planes, a substrate arranged to diffuse light from the illumination source, the substrate having a front surface and a back surface, a first linear polarizing filter located between the illumination source and the front surface of the substrate; and a second linear polarizing filter overlapping the first linear polarizer, wherein one of the first and second linear polarizing filters is rotated in relation to the other one of the first and second linear polarizing filters. In a configuration, the illumination system further comprises an illumination pupil, the illumination pupil having an axial centerline, wherein the second linear polarizing filter is smaller than the illumination pupil and at least approximately coaxial to the axial centerline of the illumination pupil, and wherein the first linear polarizing filter is larger than the imaging pupil. The second linear polarizing filter is either disposed on the back surface of the substrate, between the first polarizing filter and the substrate, or between the illumination source and the first linear polarizing filter.

BRIEF DESCRIPTION OF THE SEVERAL VIEWS OF THE DRAWING(S)

Figure 6:
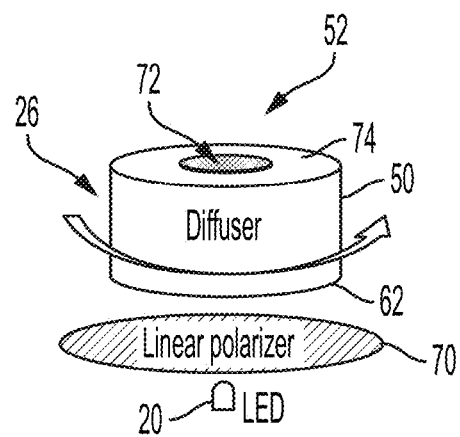
FIG. 6 is an enlarged diagram of a light obscuration element using a first and second linear polarizer, wherein the first linear polarizing filter is at least proximate the front surface of the diffuser and the second linear polarizing filter is disposed on the back surface of the diffuser.
Figure 9:
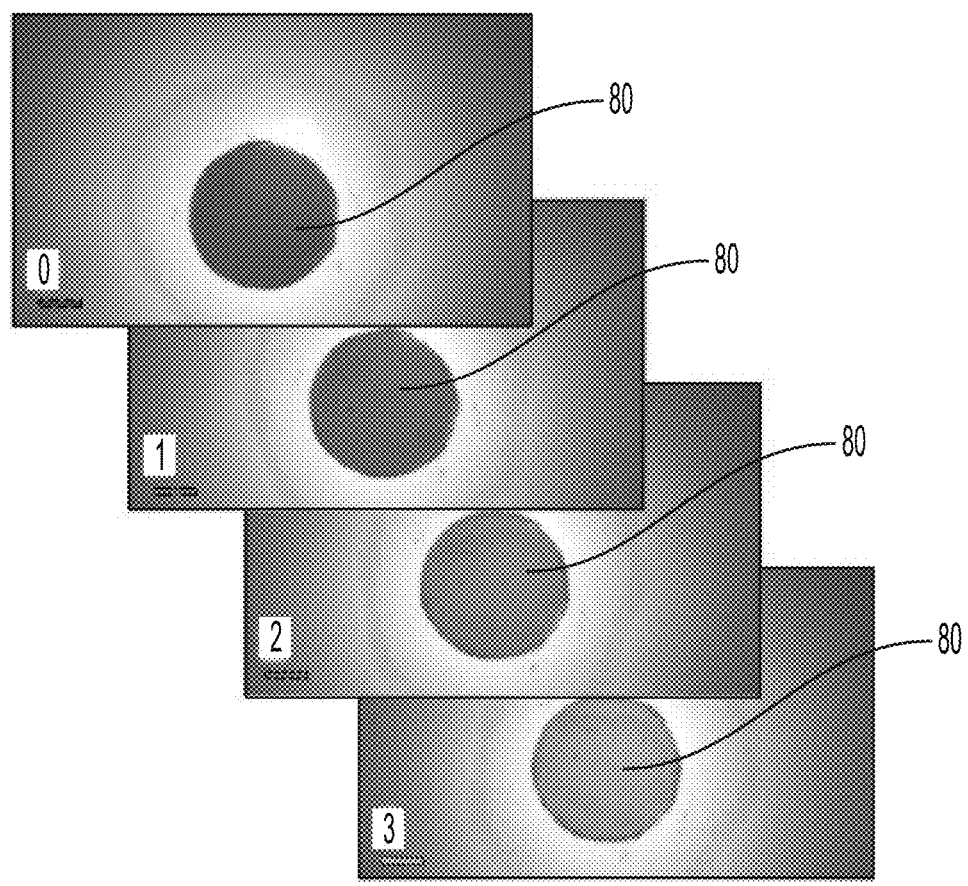
FIG. 9 is a set of images of the distributions shown in grayscale, the images obtained from using a first and second linear polarizer shown in FIG. 6 and rotating the second linear polarizer relative to the first linear polarizer.
Figures 11A, 11B:
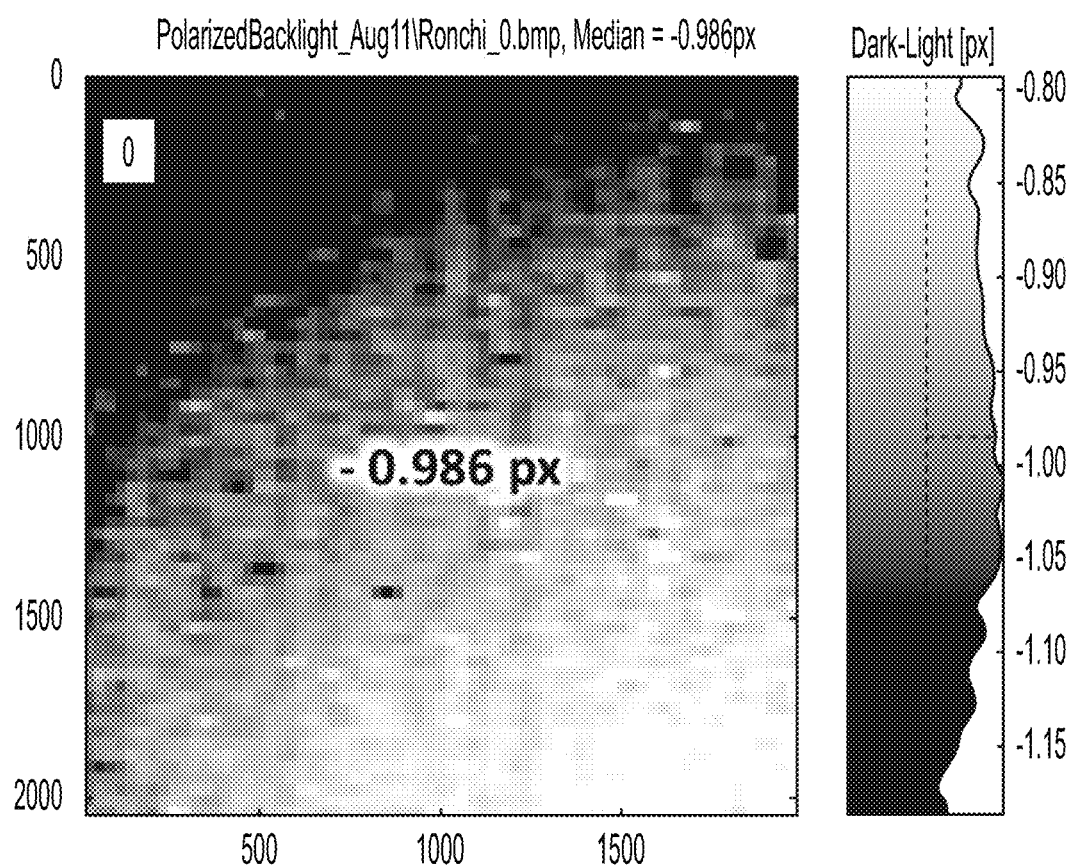

FIG. 11A is a grayscale representation of a color heatmap of edge shifts provided with a median dark width minus light width error of −0.986 px taken from a video measuring system being tuned using a first and second linear polarizer shown in FIG. 6 and rotating the second linear polarizer relative to the first linear polarizer to provide the image of the backlight distribution designed as 0 in FIG. 9.

FIG. 11B is a grayscale representation of a color histogram of values showing the median dark width minus light width error of −0.986 px taken from a video measuring system being tuned using a first and second linear polarizer shown in FIG. 6 and rotating the second linear polarizer relative to the first linear polarizer to provide the image of the backlight distribution designed as 0 in FIG. 9.

Figures 12A, 12B:
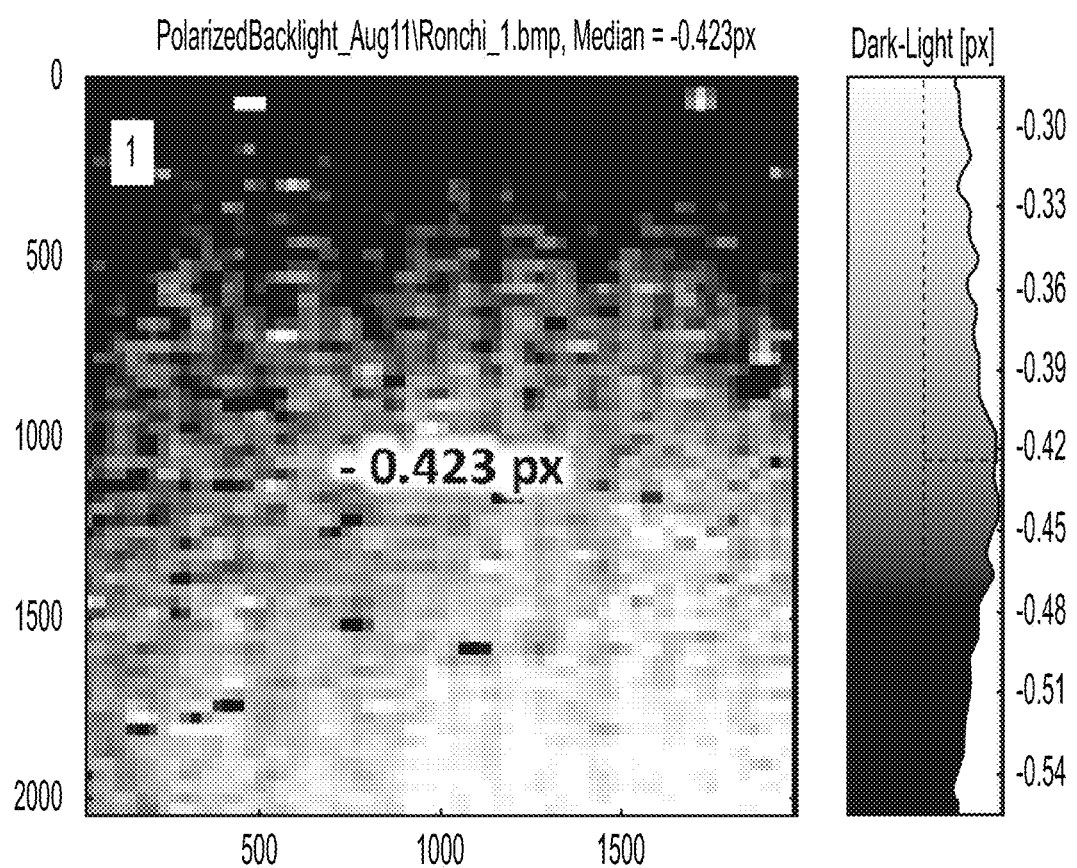

FIG. 12A is a grayscale representation of a color heatmap of edge shifts provided with a median dark width minus light width error of −0.423 px taken from a video measuring system being tuned using a first and second linear polarizer shown in FIG. 6 and rotating the second linear polarizer relative to the first linear polarizer to provide the image of the backlight distribution designed as 1 in FIG. 9.

FIG. 12B is a grayscale representation of a color histogram of values showing the median dark width minus light width error of −0.423 px taken from a video measuring system being tuned using a first and second linear polarizer shown in FIG. 6 and rotating the second linear polarizer relative to the first linear polarizer to provide the image of the backlight distribution designed as 1 in FIG. 9.

Figures 13A, 13B:
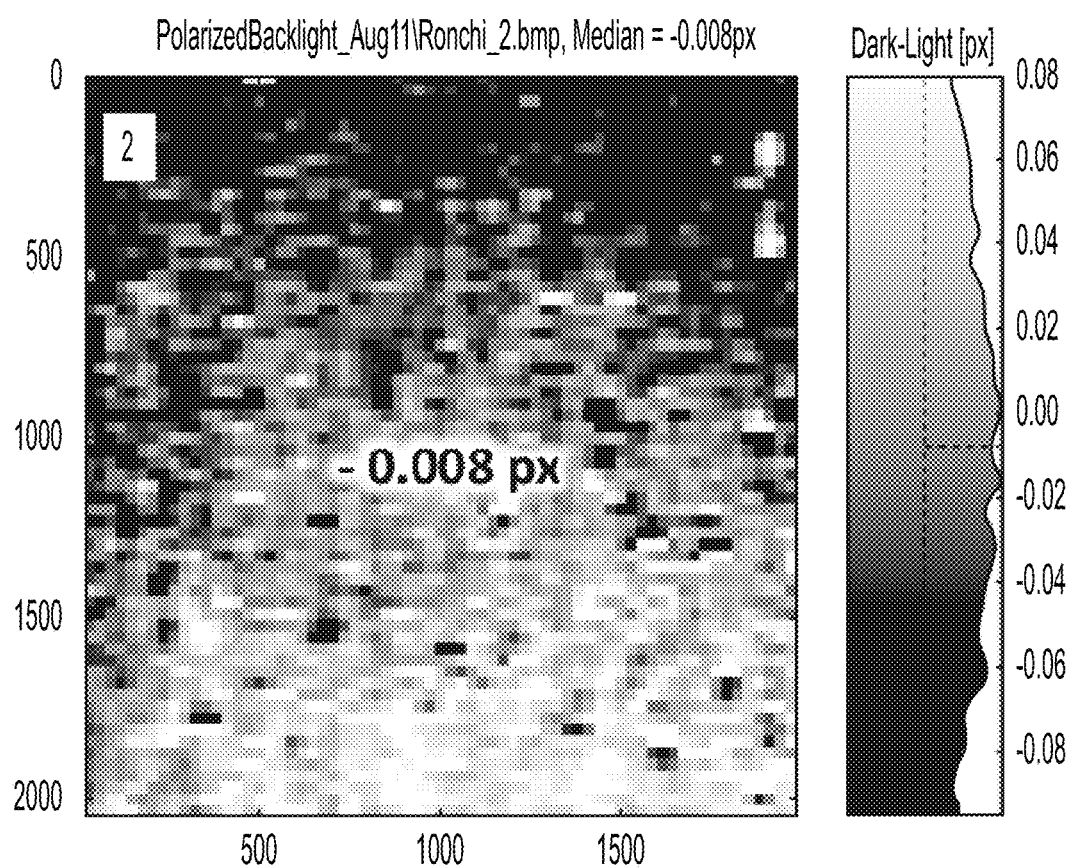

FIG. 13A is a grayscale representation of a color heatmap of edge shifts provided with a median dark width minus light width error of −0.008 px taken from a video measuring system being tuned using a first and second linear polarizer shown in FIG. 6 and rotating the second linear polarizer relative to the first linear polarizer to provide the image of the backlight distribution designed as 2 in FIG. 9.

FIG. 13B is a grayscale representation of a color histogram of values showing the median dark width minus light width error of −0.008 px taken from a video measuring system being tuned using a first and second linear polarizer shown in FIG. 6 and rotating the second linear polarizer relative to the first linear polarizer to provide the image of the backlight distribution designed as 2 in FIG. 9.

Figures 14A, 14B:
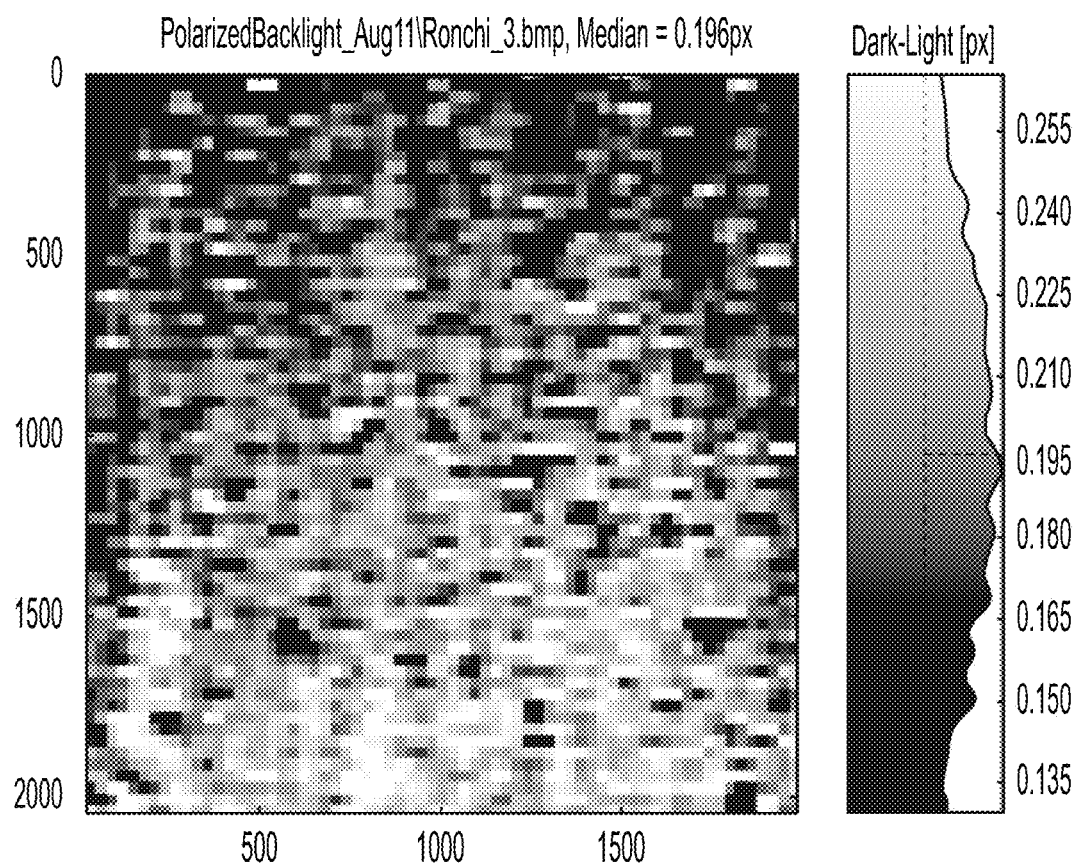

FIG. 14A is a grayscale representation of a color heatmap of edge shifts provided with a median dark width minus light width error of +0.196 px taken from a video measuring system being tuned using a first and second linear polarizer shown in FIG. 6 and rotating the second linear polarizer relative to the first linear polarizer to provide the image of the backlight distribution designed as 3 in FIG. 9.

FIG. 14B is a grayscale representation of a color histogram of values showing the median dark width minus light width error of +0.196 px taken from a video measuring system being tuned using a first and second linear polarizer shown in FIG. 6 and rotating the second linear polarizer relative to the first linear polarizer to provide the image of the backlight distribution designed as 3 in FIG. 9.

Figures 15A, 15B, 15C:
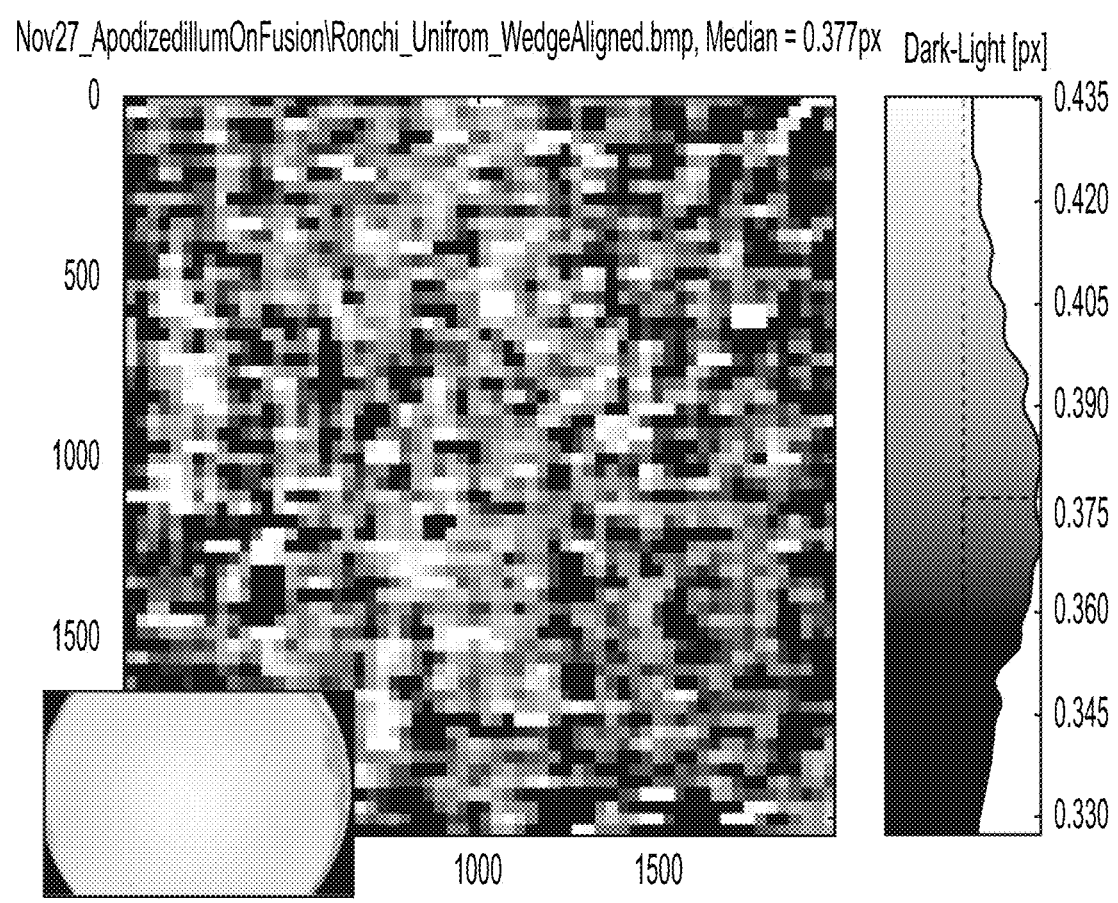

FIG. 15A is a grayscale representation of a color heatmap of edge shifts provided with a median dark width minus light width error of +0.377 px taken from a video measuring system without a light obscuration apparatus.

FIG. 15B is a grayscale representation of a color histogram of values showing the median dark width minus light width error of +0.377 px taken from a video measuring system without a light obscuration apparatus.

FIG. 15C is an image of the backlight distribution shown in grayscale which created the plot shown in FIG. 15A.

Figures 16A, 16B:
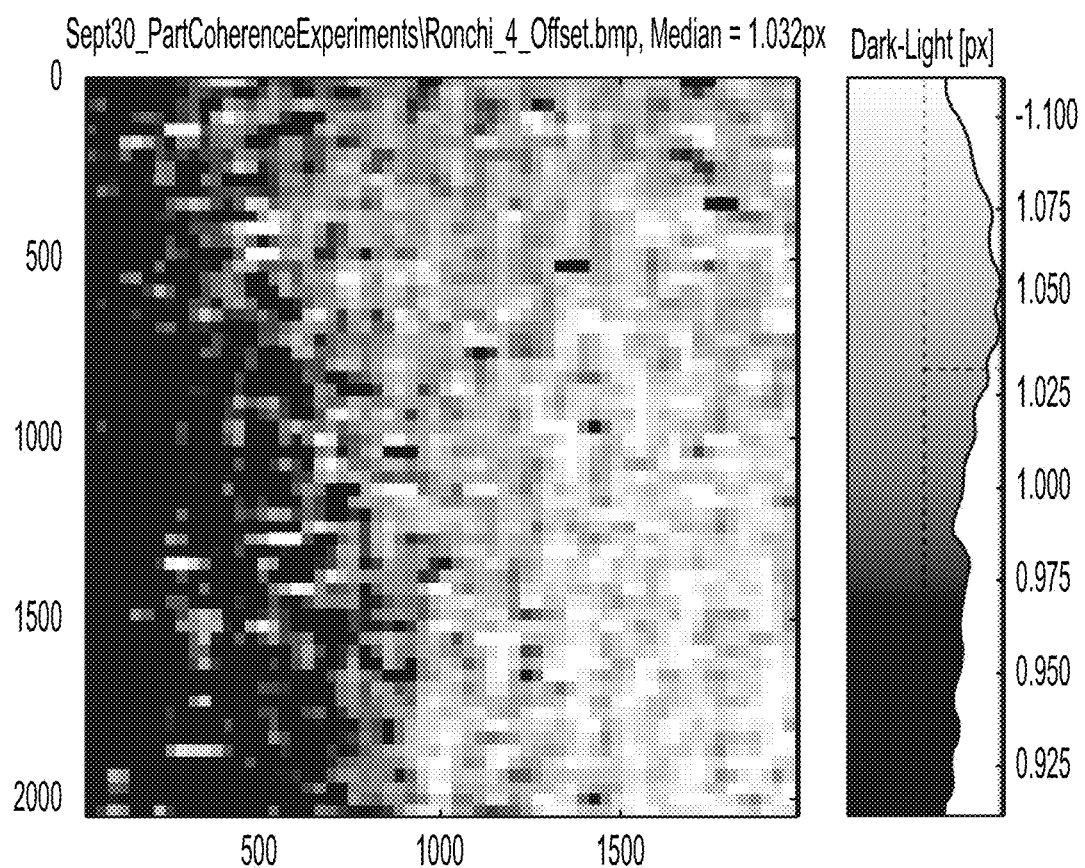

FIG. 16A is a grayscale representation of a color heatmap of edge shifts provided with a median dark width minus light width error of +1.032 px taken from a video measuring system without a light obscuration apparatus where the illumination source is not properly collimated.

FIG. 16B is a grayscale representation of a color histogram of values showing the median dark width minus light width error of +1.032 px taken from a video measuring system without a light obscuration apparatus where the illumination source is not properly collimated.

DETAILED DESCRIPTION OF THE INVENTION

At the outset, it should be appreciated that like reference numbers are intended to identify the same structural elements, portions, or surfaces consistently throughout the several drawing figures, as such element, portions or surfaces may be further desired or explained by the entire written specification, or which this detailed description is an integral part. Unless otherwise indicated, the drawings are intended to be read together with the specification, and are to be considered a portion of the entire written description of this invention.

Figure 1:
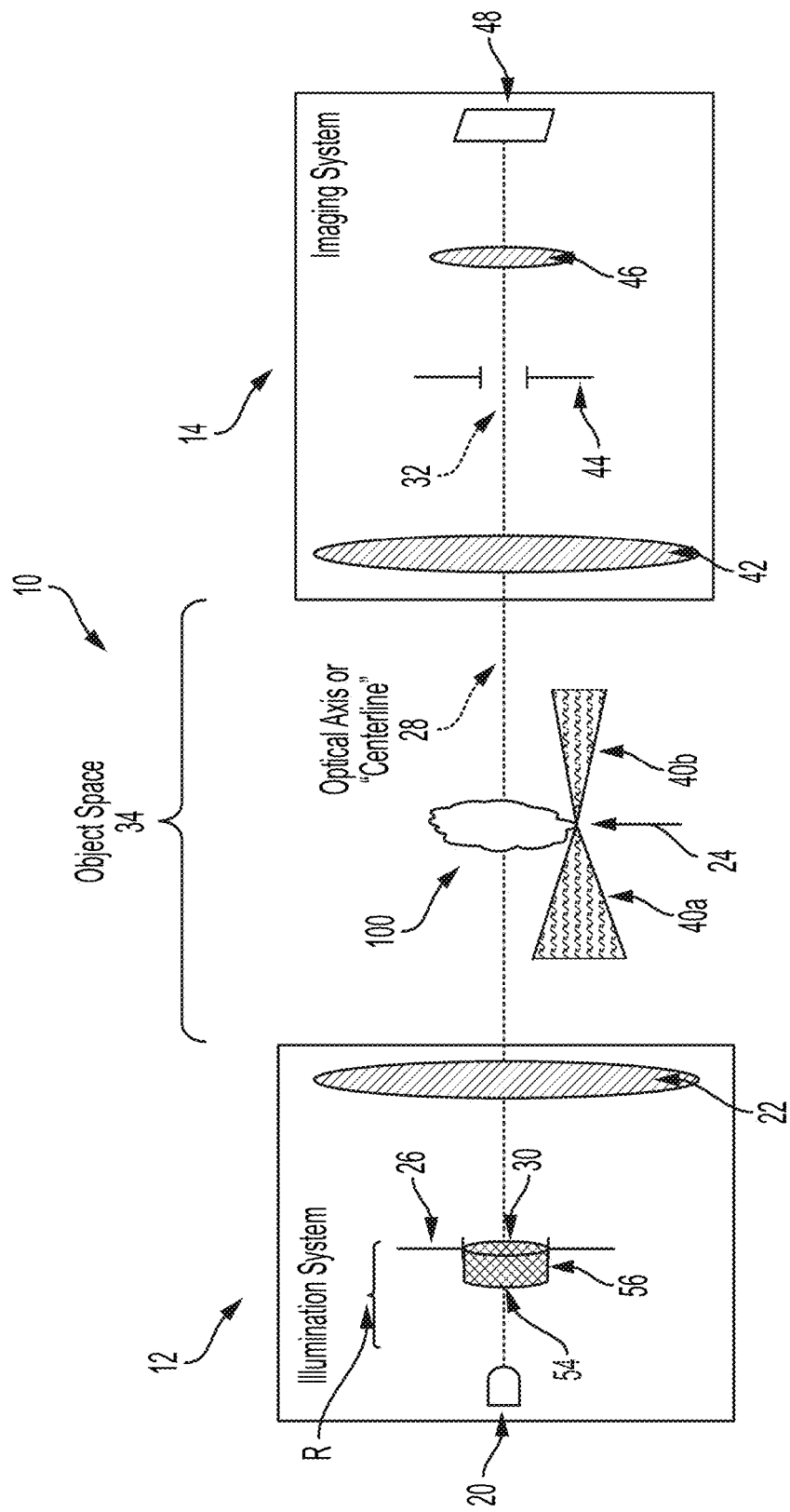
FIG. 1 is a diagram of a video measuring system for backlighting a test object having an illumination system and an imaging system arranged for capturing the silhouette of the backlit test object, wherein the angular extent of the backlight is larger than the angular extent received by the imaging pupil.
Figure 2:
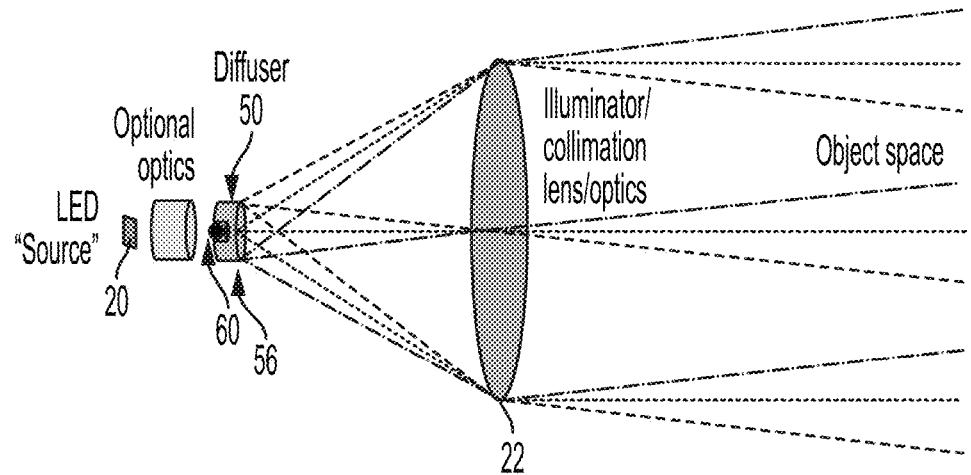
FIG. 2 is a diagram of an illumination system of the video measuring system for backlighting a test object.
Figure 3:
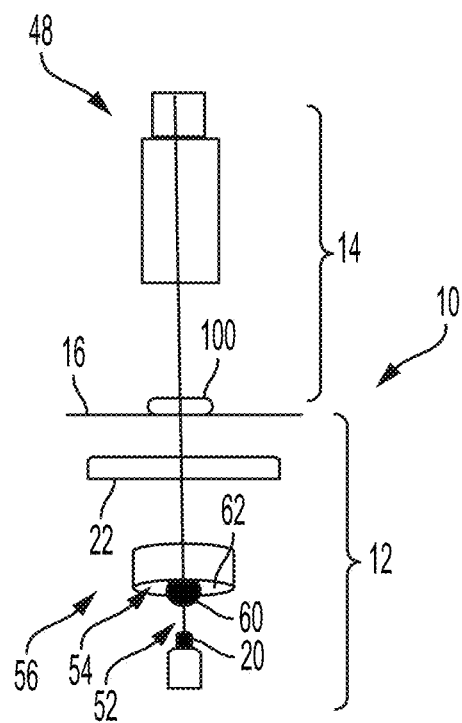
FIG. 3 is a diagram of a video measuring system for backlighting a test object showing the test object on a mounting stage.

The video measuring system 10 shown in FIGS. 1-3 is presented in a schematic layout featuring an illumination system 12 for backlighting a test object 100 and an imaging system 14 arranged for measuring a silhouette of the test object 100. Measuring the silhouette of backlit test objects is known as "shadow imaging" or "silhouette imaging." The video measuring system 10 for opaque parts is one of many possible configurations, which includes a test object 100 positioned on a mounting stage 16. The mounting stage 16 can be made of transparent optical material or otherwise provide for the transmission of light to convey light past the test object 100 to the imaging system 14. The test object 100 is backlit by the illumination system 12 having an illumination source 20 and an illumination lens 22. Although one illumination lens is shown, it should be appreciated that additional illumination lenses may be included in a configuration. Typically, the illumination lens 22 is a collimation lens providing collimated rays, for example, as shown in FIG. 2. The illumination system 12 further includes an illumination pupil 26. The illumination system 12 in one configuration is aligned with an optical axis or "centerline" 28 of the video measuring system 10. The imaging system 14 is arranged for detecting transmitted light from the illuminator on the opposite side of the test object 100, known as diascopic illumination.

The imaging system 14 includes at least an imager, for example, an arrayed image sensor 48, which can be aligned along a common optical axis 28 of the video measuring system 10. The illumination system 12 includes a relatively high angular extent compared to the imaging system 14. The imaging system 14 further includes at least one imaging front-end lens 42 and an imaging pupil 44. The imaging system 14 also includes a rear lens 46 and an arrayed image sensor 48 in the image plane. The front-end lens 42, together with the collimating lens 22, images the illumination pupil 26 of the illumination system 12 onto the imaging pupil 44 of the imaging system 14. The silhouette of the test object 100 is collected from a wider range of off-axis angles, but opportunities for stray deflections from the test object 100 to enter the imaging pupil are limited because the imaging system 14 has an object space numerical aperture that is smaller than the object space numerical aperture of the illumination system 12. Using this video measuring system 10, the illumination output 24 has an angular extent 40a in object space 34 that is larger than the angular extent 40b received by the imaging pupil 44. In one configuration, the angular extent 40a of the illumination source 20 in object space 34 is approximately twice as large as the angular extent 40b received by the imaging pupil 44. It should be appreciated that the illumination pupil 26 and the imaging pupil 44 are in at least approximately conjugate image planes, and typically are in conjugate image planes. The illumination pupil 26 and the imaging pupil 44 each include an axial centerline 30, 32, respectively, which aligns with the optical axis 28 of the video measuring system 10.

The illumination source 20 can include a standard backlight having a high angular extent. The angular extent of the illumination source 20 in object space in one configuration is approximately twice as large as the angular extent received by the imaging pupil 44. The backlight object space f-number (F/#) may be about half that of the associated imager. For example, the illumination system 12 may have an object space F/50 while the imaging system 14 may have an F/100. The illumination source 20 in one configuration may be a light emitting diode (LED) or a plurality of LEDs. In another configuration, the illumination source 20 is an incandescent lamp, high intensity discharge (HID) lamp, or superluminescent diode (SLD or SLED). The illumination system 12 further includes a substrate 50 arranged to diffuse light from the illumination source 20. The substrate 56 is preferably at least approximately aligned with the optical axis 28 and even more preferably the substrate 56 is a diffuser 50 aligned with the optical axis 28. The illumination system 12 also includes a light obscuration apparatus 18 comprising the substrate 56 and a light obscuration element 52 which is arranged to dim the part of the illumination distribution that is directly captured by the imaging system 14. In one configuration, the light obscuration element 52 is at least approximately coaxial to the axial centerline 30 of the illumination pupil 26, and more preferably coaxial to the axial centerline 30 of the illumination pupil 26. Even more preferably, the imaging pupil 44, light obscuration element 52 and illumination pupil are coaxial to the optical axis 28. As described below, most preferably, the imaging pupil 44 is centered on the dark spot formed by the light obscuration element 52. It should be appreciated that the substrate 56 and light obscuration element 52 can be located within a region of axial positions "R" positioned between the illumination source 20 and the illumination pupil 26.

The light obscuration apparatus 18 comprising the light obscuration element 52 and substrate 56 can take many different configurations. Many examples of the light obscuration element 52 and the substrate 56 are described below. It should be appreciated that each of the illumination distribution arrangements described emits light that is not directly captured by the imaging optical system. Further, it should be appreciated that the illumination system may optionally include additional optics between the illumination source 20 and the substrate 56.

As shown in FIGS. 1-4B, the substrate 56 can be a volumetric diffuser 50. The term "diffuse" or "diffusing" means light scattering, for example by reflection, refraction or diffraction. A volumetric diffuser 50 is generally a substrate that scatters light throughout the volume of the bulk material. An example of a volumetric diffuser 50 is a white acrylic sheet such as Acrylite 020-4, Plexiglass 2447, or similar material. However, it should be appreciated that other suitable materials are possible, and these are intended to be within the spirit and scope of the invention. Additionally, in a configuration, the volumetric diffuser 50 includes diffuse front and/or back surfaces. In another configuration, the volumetric diffuser 50 has polished or buffed surfaces.

In another configuration, the illumination system includes a substrate 56 that is a dual-sided non-volumetric diffuser, or surface diffuser. By "surface diffuser" it is meant to refer to a substrate where the points of scattering are confined to a surface, usually due to a rough surface finish on an exterior surface. Examples of "surface diffusers" include, but are not limited to, a piece of clear glass with rough ground front and back surfaces and a single-sided surface diffuser.

The light obscuration element 52 is arranged for apodizing the illuminator pupil 26 by providing a darker center and brighter annulus near the pupil edge. The light obscuration element 52 and substrate 56 control the angular distribution of light emitted from the illumination system 12. It should be appreciated that rotational symmetry within the imaging pupil 44 is important, especially when the object is out of best focus, to avoid anisotropic measurement errors.

Figure 4A:
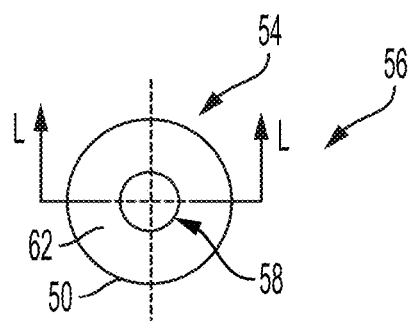
FIG. 4A is an enlarged top view of a front side of a volumetric diffuser having a light obscuration element within a bore.
Figure 4B:
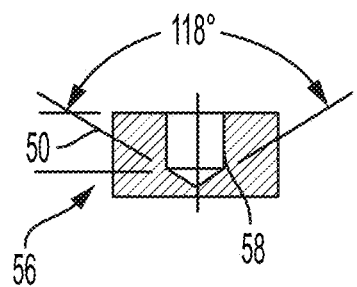
FIG. 4B is a cross-sectional view of the volumetric diffuser having a bore taken along line L-L of FIG. 4A.

One effective way of achieving distributions is using a thick volumetric diffuser 50 which is illuminated from the front side 54 uniformly, wherein a bore 58 is drilled into the center of the diffuser material and a ball 60 is disposed in the bore 58 as shown in FIGS. 4A-4B. The volumetric diffuser 50 preferably has a thickness in the range of 2 mm to 6 mm and a diameter in the range of 3 mm to 7 mm. In one configuration, the volumetric diffuser 50 has a thickness of 2.9 mm with a diameter of 5.65 mm. The ball 60 is sized to fit within the bore 58 and is typically approximately the same size as the bore 58 with tolerances that result in minimum gap sizing. In one configuration, the diameter of the bore 58 is between 1 mm and 5 mm, and more preferably between 1.5 mm and 3 mm, with a cylindrical shape. The bore 58, in certain configurations, further includes a tapered edge or cone-shaped bottom. In one configuration, the bottom is a right cone shape having an apex angle of approximately 118°. In some configurations, the depth of the bore 58 is smaller than the diameter of the ball 60. Thus, the ball 60 can in some configurations, protrude from the surface of the diffuser 50 when disposed within the bore 60. For example, the ball 60 may protrude between 0.1 mm and 0.4 mm from the front surface 62 of the diffuser 50 in one configuration, and more preferably between 0.2 mm and 0.3 mm. It should be appreciated that while a spherical, steel ball bearing is shown as the light obscuration element 52, other materials can be used and other shapes that fit within the bore 58 of the diffuser are possible. The geometry of the light obscuration element 52 may need to change depending on the properties of a specific diffuser material to produce a suitable distribution. The light obscuration element 52 can be any type of material or shape that blocks some or all of the light proximate or at the center of the illumination pupil 26. In one configuration, the ball is approximately spherical. If the diffuser 50 is volumetric and the ball 60 is not directly seen on the output side of the diffuser 50, the resulting distribution typically does not provide abrupt changes in the light intensity. The adjusting of the depth of the bore 58 as well as the diameter of the bore 58 provide control parameters for the resulting illumination distribution. The bore 58, in a configuration, is coaxial to an axial centerline of the diffuser 50. Moreover, the ball 60 and bore 58 are each at least approximately coaxial to the axial centerline of the illumination pupil 26 and imaging pupil 44, and more preferably, coaxial to the axial centerline of the illumination pupil 26 and imaging pupil 44.

It should be appreciated that other single static central obscuration components that provide less than 100% transmittance can be used instead of or in addition to the ball. Further, other light obscuration elements can be used, including, but are not limited to, rod stock, a deposited metal dot (for example, chrome on glass), shim stock disc, black paint filling in the diffuser bore, a metal foil disc, etc.

In a configuration, the substrate 56 is part of an illumination system assembly, wherein the illumination source 20 is on one side of the substrate 56 and the illumination lens element(s) 22 are on the other side.

Figure 5:
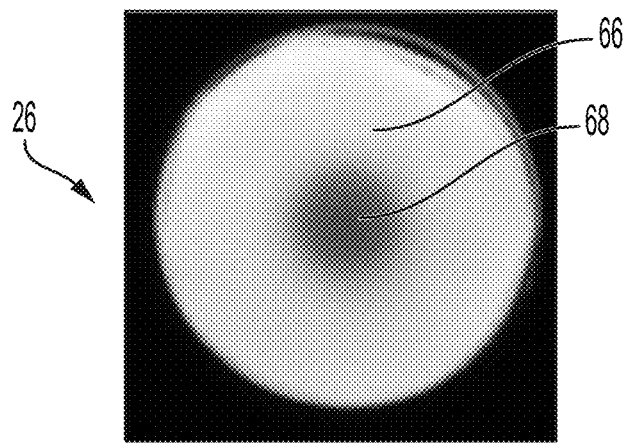
FIG. 5 is an image of an illumination distribution using the light obscuration element within the bore of FIG. 4A.

Turning to FIG. 5, this figure shows an image of an illumination distribution using the light obscuration element within the bore of FIG. 4A. It should be appreciated that while the imaging system 14 can be aligned with the illumination source 20 along an optical axis 28 such that the circular imager acceptance region is centered in the illumination distribution, having the imaging system 14 aligned with the illumination source 20 is not required. The light obscuration element 52 provides a brighter annulus 66 near the edge of the illumination pupil 26 and a dark spot 68 near the center. The light obscuration element 52 may be approximately centered to the sharp outer edge, or there may be no sharp outer edge. Preferably, however, the imaging pupil 44 is centered on the dark spot 68 formed by the light obscuration element 52.

Figure 7:
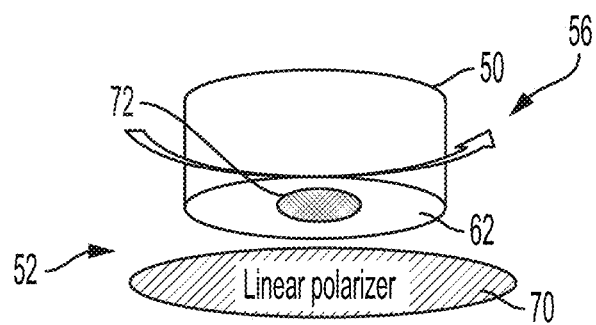
FIG. 7 is an enlarged diagram of a light obscuration element using a first and second linear polarizer, wherein the second linear polarizing filter is disposed on the front surface of the diffuser.
Figure 8:
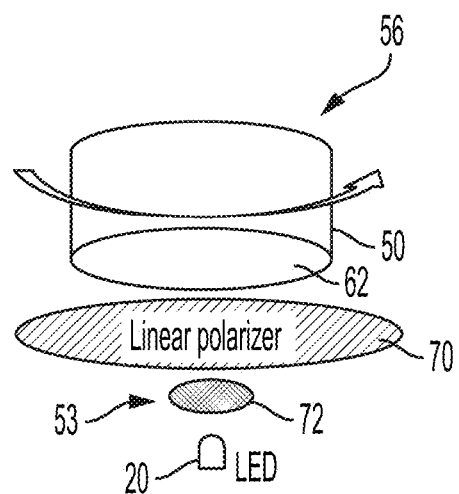
FIG. 8 is an enlarged diagram of a light obscuration element using a first and second linear polarizer, wherein the second linear polarizing filter is located between the illumination source and the first linear polarizing filter.

In another approach, an illumination distribution is achieved by a light obscuration apparatus 18 that apodizes the illumination pupil 26 using a pair of linear polarizing filters as shown in FIGS. 6-8. The intended effect of adjustable edge shift is achieved by rotating one of the polarizing filters relative to the other polarizing filter.

In one configuration, the light obscuration element 52 is a pair of linear polarized filters 70, 72. As shown in FIG. 6, linear polarizing filter 70 is located between the illumination source 20 and the front surface 62 of the substrate 56 and linear polarizing filter 72 overlaps linear polarizing filter 70. The illumination system 12 of this configuration includes an illumination source 20 as described above, a substrate 56, a first polarizing filter 70 and a second polarizing filter 72 where one of the polarizing filters 70 or 72 is at a different, adjustable orientation and rotated in relation to the other linear polarizing filters 70 or 72 to provide a darker center and brighter annulus near the edge of the illumination pupil 26. Typically, linear polarizing filter 72 has a diameter that is smaller than the illumination pupil 26 to dim the corresponding central portion of the distribution by an adjustable amount and at least approximately coaxial to the axial centerline of the illumination pupil 26. Moreover, typically linear polarizing filter 72 has a diameter that is larger than the imaging pupil 44. In a configuration, the substrate 56 is a diffuser 50. Linear polarizing filter 72, in one configuration, is disposed on the back surface 74 of the substrate 56 as shown in FIG. 6. Linear polarizing filter 72 in this configuration is disposed on the substrate 56 itself. Linear polarizing filter 72 may be taped or otherwise adhered to the back surface 74 of the substrate 56 in a manner that does not completely obstruct the transmission of light. Methods of securing the linear polarizing filter 72 to the diffuser include, but are not limited to, optically clear adhesive, clear tape, press-fitting into a hole in the substrate 56, for example, the diffuser 50, etc. In fact, linear polarizing filter 72 need not be physically attached to the diffuser 50 at all, though the diffuser 50 makes for a convenient substrate. The transmission of light through linear polarizing filter 72 is then adjusted by rotating the diffuser 50. For example, the linear polarizing filter 72 can be rotated in about 10 degree increments.

In another configuration according to FIG. 7, linear polarizing filter 72 is positioned between polarizing filter 70 and the substrate 56. In yet another configuration, as shown in FIG. 8, linear polarizing filter 72 is between the illumination source 20 and linear polarizing filter.

Figure 10:
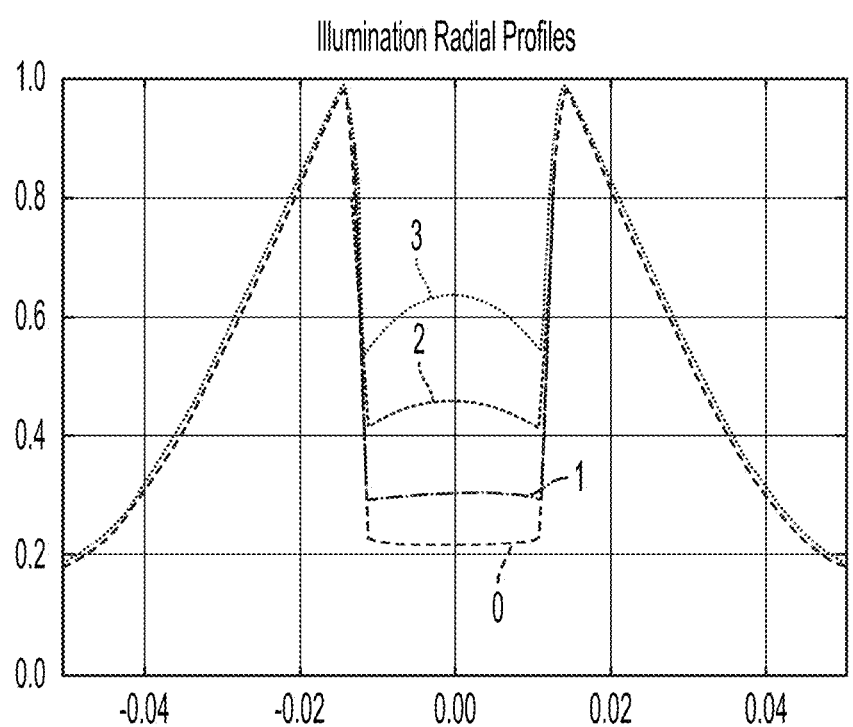
FIG. 10 is a graph of the approximate corresponding illumination radial profiles of the distributions which were extracted via digital image analysis.

Turning now to FIGS. 9 and 10, FIG. 9 is a set of images of the distributions shown in grayscale, the images obtained from an exemplifying use of linear polarizing filters 70, 72 shown in FIG. 6 and rotating linear polarizing filter 72 relative to linear polarizer 70. FIG. 10 is a graph of the approximate corresponding illumination radial profiles of the distributions which were extracted via digital image analysis. In this graph, the x-axis is the distance from the distribution's center and the y-axis is the relative intensity at each radial position. Here, in this example, linear polarizing filter 72 had a diameter that was slightly larger than the imaging pupil 44, was taped to the diffuser 50, and rotated in about 10 degree increments (labeled 0, 1, 2, and 3) starting at the least transmissive rotational position until the edges in the images of a test object 100 did not appear shifted. In this configuration, the linear polarizing filter 72 was aligned by eye to the center of the bright portion of the distribution created by the illumination source 20 by translating the diffuser 50. Images of the distributions themselves are shown below in grayscale, labeled 0, 1, 2, and 3, and the central portion 80 can be observed getting lighter as the diffuser 50 is rotated. Maps of edge shifts, as shown in the grayscale representations of color heatmaps in FIGS. 11A, 12A, 13A, and 14A, are provided with the median dark width minus light width error displayed in text on the corresponding plots. The error map plots described herein of FIGS. 11A, 12A, 13A, and 14A show a two-dimensional data visualization using a selected gradient, wherein values of the difference between the dark stripe widths and the adjacent and bright stripe widths are given assignments along the grayscale based on the greatest and least values calculated in the dark width minus light width calculation. In a color heatmap version of the images in FIGS. 11A, 12A, 13A, and 14A, the different colors along the RGB scale correspond with the levels of brightness of the grayscale. More specifically, in one configuration of the color heatmap version of the images in FIGS. 11A, 12A, 13A, and 14A, the largest dark minus light pixel value is represented by red, a median pixel value is represented by green, and the smallest dark minus light pixel value is represented by violet.

Additionally, a histogram of values is shown in FIGS. 11B, 12B, 13B, and 14B, respectively. FIGS. 11B, 12B, 13B, and 14B each depict a histogram in grayscale using different levels of brightness to represent colors along the RGB scale. In color versions of the grayscale histograms shown in FIGS. 11B, 12B, 13B, and 14B, different colors along the RGB scale correspond with the levels of brightness of the grayscale. More specifically, in color versions of the grayscale histograms described herein, the histograms classify colors in the color error map, showing the spread of values along the RGB scale from the highest dark minus light value, which can be represented by red at the top of the dark minus light pixel histogram, median dark minus light value which can be represented by green and located approximately near the horizontal line on the histogram, to lowest dark minus light which can be represented by violet at the bottom. The method used to measure the magnitude of edge shift on an existing video measuring system 10 is as follows.

First, a chrome on glass Ronchi ruling with a verified 50% duty cycle is placed in the focus of the imaging system 14 and an image is captured. Next, the digital image is analyzed by finding a variety of edge positions, preferably using the same edge finding method that will be used when measuring real parts. Edge positions throughout the image (i.e. the system's field of view or FoV) are found and the difference between the dark stripe widths and the adjacent and bright stripe widths is determined. If the difference is not zero, there is some edge shift that changes direction with the edge orientation. Next, the dark stripe width minus an adjacent light stripe width is mapped throughout the field of view of the imaging optics, which is used to generate a false-color map of error magnitude. The median of all dark minus light values is considered to reduce this to a single value. In the analysis output figure, FIG. 15A, for example, the median of all dark minus light values is 0.377 px. Additionally, a histogram of values is shown in FIG. 15B, wherein the highest dark minus light value was 0.435 px, shown in light gray in FIG. 15B, the median was 0.377 px shown in medium gray located in the area of the horizontal line, and the lowest dark minus light value was 0.330 px shown in dark gray at the bottom of the histogram. In one configuration of a color version of the histogram depicted in 15B, the highest dark minus light value of 0.435 px can be shown in red at the top, the median of all dark minus light values of 0.377 px can be shown in green located in the area of the horizontal line, and the lowest dark minus light value of 0.330 px can be shown in violet at the bottom of a color version of the histogram. This shows the spread of values in the plot, which can help indicate a problem, e.g. the range of edge shift values is significantly higher than other machines of the same design.

Considering partial coherence effects, traditional illuminators tend to shift the edge from dark to light, so the dark stripes tend to appear wider than neighboring light stripes. Therefore, the dark-light values tend to be positive. As an example of this tendency, FIG. 15A is a grayscale representation of a color error map as described above, taken from a multisensory video measuring machine with a backlight. An image of the backlight distribution that created this plot, FIG. 15C, is also included in the bottom left hand corner of the analysis output figure.

Having the edge shift measured throughout the FoV is useful for diagnosing inconsistent illumination angular distribution or inconsistent alignment between the illuminator system 12 and the imager system 14. For example, if the illumination source 20 (also referred to as the backlight) is not properly collimated, a field-dependent error map is possible. Similarly, if the arrayed image sensor 48 is not telecentric but the backlight is properly collimated, a pattern can be visible in the error map in the presence of partial coherence edge shift effects. A field-dependent pattern indicates a problem in the system, but does not specify the root cause. FIGS. 16A and 16B show an example of a field dependent error map. In the analysis output figure, FIG. 16A, the median of all dark minus light values is +1.032 px. Additionally, a histogram of values is shown in FIG. 16B, wherein the highest dark minus light value was 1.100 px, which is shown in light gray, the median was 1.032 px, which is shown in medium gray, and the lowest was 0.925 px, which is shown in dark gray. In one configuration of a color histogram version of FIG. 16B, the highest dark minus light value of 1.100 px can be shown in red at the top, the median of all dark minus light values of 1.032 px can be shown in green located in the area of the horizontal line on the histogram, and the lowest dark minus light value of 0.925 px can be shown in violet at the bottom.

Other edge orientations can be tested by rotating the Ronchi ruling before capturing and image and running the analysis. Since a well-aligned system is expected to have isotropic partial coherence edge shift, a single orientation can be cautiously used as a measure of this aspect of machine performance.

This method has an advantage of not needing an accurate (or any) physical pixel size, so at a minimum, the magnification of the video measuring machine 10 need not be calibrated. This is because the found edge positions are referenced to other found edge positions in the same image. The only thing that is needed is an artifact with a verified 50% duty cycle, for example, a chrome on glass Ronchi ruling. In order to convert the edge shifts from units of pixels into physical distance, an object space pixel size is needed, but a good approximation of this parameter is usually adequate for this purpose.

Since the measurement is the dark width minus light width, the isotropic edge shift is counted several times (two widths at two edges per width). If we assume the edge shift is constant, the shift of any individual edge can be calculated simply by dividing the dark-light value by 4. Another convenient calculation is that objects whose widths are measured will typically have an error of half the dark minus light value since a width constitutes two measured edges.

Thus, using the above method to measure the magnitude of edge shift on an existing video measuring system with an illumination system 12 tuned using a light obscuration apparatus 18 described herein to remove partial coherence edge shift, the map of edge shifts as shown in the grayscale representations of the color heatmaps in FIGS. 11A, 12A, 13A, and 14A, show a measured edge shift was closest to zero (0.008 pixels), and therefore having the most desirable corrective factor, for configuration 2 shown in FIG. 13A.

If polarized illumination creates issues for measurement of certain artifacts, a wave plate may be used after linear polarizing filters 70 and 72 to mitigate such effects by creating non-linear output polarizations.

It should be appreciated that alternative configurations of the pair of linear polarizing filters approach may be used. For example, oversizing linear polarizing filter 72 to be significantly larger in diameter than the imaging pupil 44 could ease alignment sensitivity while maintaining enough adjustment to correct the edge shift the desired amount. Alternatively, linear polarizing filter 72 could be placed on the side of the diffuser 50 that is closer to the illumination source 20, thus softening any features in the output distribution via action of the diffusive substrate.

Finally, a mechanism (not shown) to rotate linear polarizing filter 70 may be used instead of rotating the diffuser 50 having linear polarizing filter 72 since rotation of the diffuser 50 can throw the system out of alignment, including but not limited to the alignment of the linear polarizing filter 72 to the illumination source 20, the linear polarizing filter 72 to the imaging system 12, or both.

As the present disclosure describes particular configurations, it is not limited to these configurations. Alternative configurations, embodiments, or modifications, which will be encompassed by the invention can be made by those skilled in the configurations, embodiments, modifications or equivalents, may be included in the spirit and scope of the invention, as defined by the appended claims.

The invention claimed is:

1. A video measurement system for measuring a test object comprising:
   (a) an imaging system comprising an imager having an imaging pupil, the imager arranged for viewing at least a portion of a silhouette of the test object by receiving light transmitted by the test object over a first angular extent; and
   (b) an illumination system comprising (i) an illumination source; (ii) an illumination pupil; (iii) a lens system; (iv) output having a second angular extent in object space that is larger than the first angular extent received by the imaging pupil; and (v) a substrate arranged to diffuse light from the illumination source, the substrate having an axial centerline and a light obscuration element, wherein the light obscuration element is approximately coaxial to the axial centerline of the substrate, and wherein the pupils of the illumination and imaging systems are in conjugate image planes.

2. The video measurement system of claim 1 wherein the substrate comprises a front surface illuminated by the illumination source and a back surface, and wherein the light obscuration element is disposed on the front surface and is approximately coaxial to the axial centerline of the substrate.

3. The video measurement system of claim 1 wherein the substrate is a volumetric diffuser.

4. The video measurement system of claim 3 wherein the illumination pupil includes an axial centerline and wherein the substrate further comprises a bore through the front surface and a ball disposed within the bore, wherein the bore is approximately coaxial to the axial centerline of the illumination pupil.

5. The video measurement system of claim 4 wherein the ball is an opaque ball.

6. The video measurement system of claim 4 wherein the ball is spherical and the bore is substantially cylindrical.

7. The video measurement system of claim 1 wherein the illumination system has an object space numerical aperture that is larger than an object space numerical aperture of the imager.

8. The video measurement system of claim 1 wherein the second angular extent of the illumination system is twice as large as the first angular extent received by the imaging pupil.

9. The video measurement system of claim 1 wherein the imaging pupil is approximately aligned with the light obscuration element.

10. The video measurement system of claim 1 wherein the diffuser comprises a front surface illuminated by the illumination source and a back surface, and wherein the light obscuration element is a pair of linear polarized filters comprising (i) a first linear polarizing filter located between the illumination source and the front surface of the substrate; and (ii) a second linear polarizing filter overlapping the first linear polarizer, wherein one of the first and second linear polarizing filters is rotated in relation to the other one of the first and second linear polarizing filters.

11. The video measurement system of claim 10 wherein the illumination pupil includes an axial centerline, wherein a diameter of the second linear polarizing filter is smaller than a diameter of the illumination pupil and approximately coaxial to the axial centerline of the illumination pupil, and wherein the second linear polarizing filter is larger than a diameter of the conjugate image of the imaging pupil at the back surface of the substrate.

12. The video measurement system of claim 11 wherein the second linear polarizing filter is adhered to the back surface of the substrate.

13. The video measurement system of claim 12 wherein the substrate is rotated to rotate the second linear polarizing filter relative to the first linear polarizing filter.

14. The video measurement system of claim 12 further comprising a mechanism to rotate the first linear polarizing filter relative to the second linear polarizing filter.

15. The video measurement system of claim 11 wherein the second linear polarizing filter is adhered to the front surface of the substrate.

16. The video measurement system of claim 11 wherein the second linear polarizing filter is located between the illumination source and the first linear polarizing filter.

17. A video measurement system for measuring a test object comprising:
(a) an imaging system comprising an imager having an imaging pupil, the imager arranged for viewing at least a portion of a silhouette of the test object by receiving light transmitted by the test object over a first angular extent;
(b) an illumination system comprising an illumination source, an illumination pupil, and a lens system, the illumination system having a second angular extent that is larger than the first angular extent received by the imaging pupil and an output wherein the pupils of the illumination and imaging systems are in conjugate image planes;
(c) a substrate arranged to diffuse light from the illumination source, the substrate having a front surface and a back surface, wherein a bore is disposed in the front surface and wherein the front surface is illuminated by the illumination source; and
(d) an opaque ball disposed in the bore through the front surface of the substrate and sized to provide light obscuration of a portion of light from the illumination source.

18. The video measurement system of claim 17 wherein the substrate front surface is diffuse and the substrate back surface is diffuse.

19. The video measurement system of claim 18 wherein the ball is a spherical ball bearing and the bore is substantially cylindrical.

20. The video measurement system of claim 17 wherein the substrate is a volumetric diffuser.

21. The video measurement system of claim 17 wherein the substrate further comprises an axial centerline and wherein the bore is approximately coaxial to the axial centerline of the substrate.

22. The video measurement of claim 17 wherein the imaging pupil and the ball each have an axial centerline, wherein the imaging pupil is approximately coaxial to the axial centerline of the ball.

23. A video measurement system for measuring a test object comprising:
(a) an imaging system comprising an imager having an imaging pupil, the imager arranged for viewing at least a portion of a silhouette of the test object by receiving light transmitted by the test object over a first angular extent;
(b) an illumination system having an illumination source, an illumination pupil, and a lens system, the illumination system having a second angular extent that is larger than the first angular extent received by the imaging pupil and an output, wherein the pupils of the illumination and imaging systems are in conjugate image planes;
(c) a substrate arranged to diffuse light from the illumination source, the substrate having a front surface and a back surface;
(d) a first linear polarizing filter located between the illumination source and the front surface of the substrate; and
(e) a second linear polarizing filter overlapping the first linear polarizer, wherein one of the first and second linear polarizing filters is rotated in relation to the other one of the first and second linear polarizing filters.

24. The video measurement system of claim 23 wherein the substrate front surface is diffuse and the substrate back surface is diffuse.

25. The video measurement system of claim 23 wherein the substrate is a volumetric diffuser.

26. The video measurement system of claim 23 wherein the illumination pupil includes an axial centerline, wherein the second linear polarizing filter is smaller than the illumination pupil and approximately coaxial to the axial centerline of the illumination pupil, and wherein the first linear polarizing filter is larger than the imaging pupil.

27. The video measurement system of claim 23 wherein the second linear polarizing filter is either disposed on the back surface of the substrate, between the first polarizing filter and the substrate, or between the illumination source and the first linear polarizing filter.

\* \* \* \* \*